United States Patent
Kneidel

(10) Patent No.: US 8,919,751 B2
(45) Date of Patent: Dec. 30, 2014

(54) RIVETED DIAPHRAGM SPRING HYSTERESIS PACKAGE

(75) Inventor: Craig Kneidel, Massillon, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 107 days.

(21) Appl. No.: 13/541,165

(22) Filed: Jul. 3, 2012

(65) Prior Publication Data

US 2013/0015612 A1 Jan. 17, 2013

Related U.S. Application Data

(60) Provisional application No. 61/506,334, filed on Jul. 11, 2011.

(51) Int. Cl.
| | | |
|---|---|---|
| *F16F 1/20* | (2006.01) | |
| *F16D 3/14* | (2006.01) | |
| *F16F 15/129* | (2006.01) | |
| *F16D 13/68* | (2006.01) | |
| *F16F 3/02* | (2006.01) | |

(52) U.S. Cl.
CPC . *F16D 13/68* (2013.01); *F16F 3/02* (2013.01); *F16F 15/129* (2013.01)
USPC ...... 267/162; 192/214; 192/214.1; 464/68.41

(58) Field of Classification Search
CPC ...... F16B 39/24; Y10S 411/96; F16F 15/129; F16F 15/1238; F16F 1/32
USPC .......... 267/158, 161, 162, 164, 165, 159; 411/544, 155, 156; 464/68.4, 68.41, 464/68.9, 84, 100, 169, 180; 192/70.17, 192/212–214.1
See application file for complete search history.

(56) References Cited

U.S. PATENT DOCUMENTS

| | | | | | |
|---|---|---|---|---|---|
| 2,364,988 | A | * | 12/1944 | McFarland | 464/68.41 |
| 2,943,661 | A | * | 7/1960 | Stern | 411/134 |
| 3,266,271 | A | * | 8/1966 | Stromberg | 464/64.1 |
| 4,093,054 | A | | 6/1978 | Johns | |
| 4,406,357 | A | * | 9/1983 | Nagano et al. | 192/213.31 |
| 4,537,295 | A | * | 8/1985 | Fadler et al. | 192/213.12 |
| 4,585,110 | A | * | 4/1986 | Gobel et al. | 192/214.1 |
| 4,690,257 | A | * | 9/1987 | Suzuki et al. | 192/3.31 |
| 4,690,365 | A | * | 9/1987 | Miller et al. | 248/650 |
| 4,941,860 | A | * | 7/1990 | Graton | 464/68.4 |
| 5,518,099 | A | * | 5/1996 | Murphy | 192/207 |
| 5,687,453 | A | * | 11/1997 | Megregian et al. | 16/221 |
| 6,146,279 | A | * | 11/2000 | Lebas et al. | 464/68.41 |
| 6,939,097 | B2 | * | 9/2005 | Carr et al. | 411/368 |
| 2010/0210366 | A1 | | 8/2010 | Droll et al. | |

\* cited by examiner

*Primary Examiner* — Bradley King
*Assistant Examiner* — Stephen Bowes
(74) *Attorney, Agent, or Firm* — Simpson & Simpson, PLLC

(57) ABSTRACT

A hysteresis assembly, including: first, second, and third plates; at least one fastener connecting the first and third plates; and, at least one resilient element. The resilient element is: disposed between the first and second plates; disposed about the fastener; and arranged to urge the second plate into frictional contact with the third plate. A damper assembly, including: first and second cover plates arranged to receive torque; a flange axially disposed between the cover plates; at least one first resilient element engaged with the cover plates and the flange and arranged to transmit the torque to the flange; at least one fastener connecting the cover plates and passing through the flange; and at least one second resilient element. The resilient element is: disposed between the first cover plate and the flange; disposed about the fastener; and arranged to urge the flange into frictional contact with the second cover plate.

9 Claims, 6 Drawing Sheets

RIVETED DIAPHRAGM SPRING HYSTERESIS PACKAGE

CROSS-REFERENCE TO RELATED APPLICATIONS

This application claims the benefit under 35 U.S.C. §119 (e) of U.S. Provisional Application No. 61/506,334 filed Jul. 11, 2011, which application is incorporated herein by reference.

TECHNICAL FIELD

The present disclosure relates to a hysteresis assembly, in particular, a hysteresis assembly in a damper. One or more resilient elements are placed about fasteners connecting plates in the hysteresis or damper assembly to urge plates in the hysteresis or damper assembly into frictional contact.

BACKGROUND

It is known to use a single diaphragm spring, fully surrounding an axis of rotation for a damper, to create hysteresis in the damper assembly. Specifically, the diaphragm spring reacts against a cover plate to urge a flange into frictional engagement with another cover plate. The use of a single washer requires a full 360 degree installation space, which limits fabrication options. Stamping a diaphragm spring large enough to use as described above generates an undesirably large amount of scrap material.

SUMMARY

According to aspects illustrated herein, there is provided a hysteresis assembly, including: first, second, and third plates; at least one fastener connecting the first and third plates; and, at least one resilient element. The at least one resilient element is: disposed, in an axial direction, between the first and second plates; disposed about the at least one fastener; and arranged to urge the second plate into frictional contact with the third plate.

According to aspects illustrated herein, there is provided a damper assembly, including: first and second cover plates arranged to receive torque; a flange axially disposed between the first and second cover plates; at least one first resilient element engaged with the first and second cover plates and the flange and arranged to transmit the torque to the flange; at least one fastener connecting the first and second cover plates and passing through the flange; and at least one second resilient element. The at least one resilient element is: axially disposed between the first cover plate and the flange; disposed about the at least one fastener; and arranged to urge the flange into frictional contact with the second cover plate.

According to aspects illustrated herein, there is provided a damper assembly, including: first and second cover plates arranged to receive torque; a flange axially disposed between the first and second cover plates; at least one first resilient element engaged with the first and second cover plates and the flange and arranged to transmit the torque to the flange; at least one fastener fixedly connected to the first and second cover plates, passing through the flange, and at least partially rotatable with respect to the flange; and a plurality of second resilient elements. The plurality of second resilient elements: wholly axially disposed between the first cover plate and the flange; disposed about the at least one fastener; arranged to urge the flange into frictional contact with the second cover plate; and having respective outer circumferences and respective openings forming respective inner circumferences. The respective inner circumferences are disposed further in a first direction, with respect to respective axis passing through the respective openings, than the respective outer circumferences. For each resilient element in the plurality of second resilient elements: the first direction is from the second plate toward the first plate; or the first direction is from the first plate toward the second plate; or for one resilient element in the plurality of second resilient elements, the first direction is from the second plate toward the first plate; and for another resilient element in the plurality of second resilient elements, the first direction is from the first plate toward the second plate.

These and other objects and advantages of the present disclosure will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
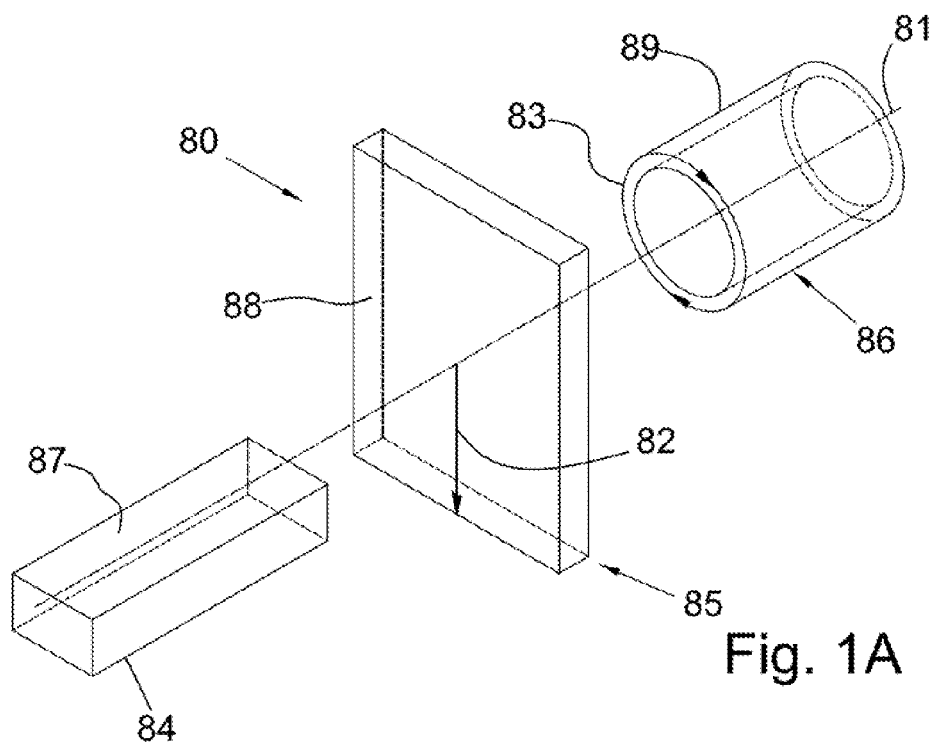
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
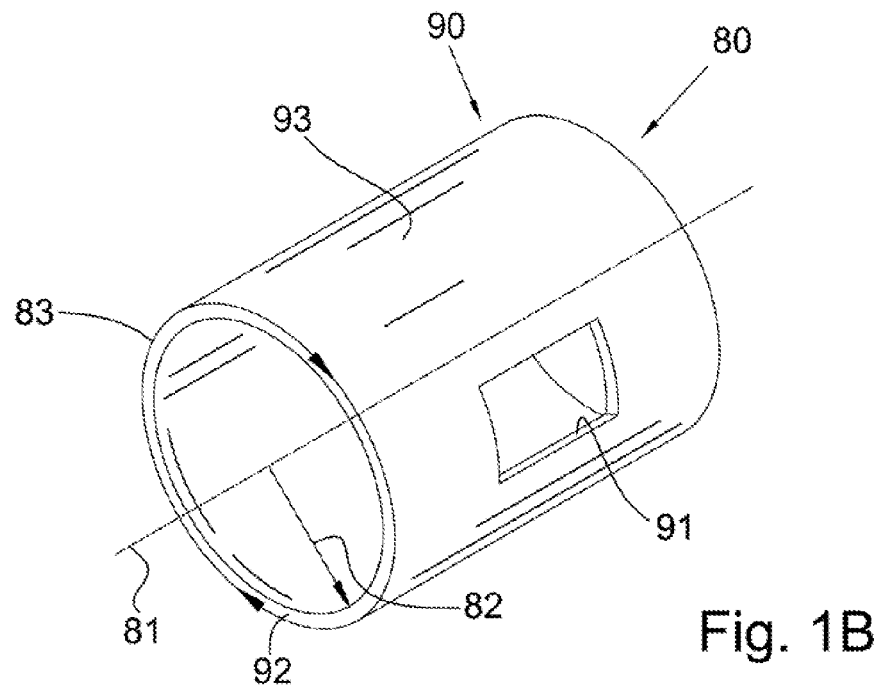
FIG. 1B is a perspective view of an object in the cylindrical coordinate system of FIG. 1A demonstrating spatial terminology used in the present application; and, FIG. 2 is a cross-section of a portion of a hysteresis assembly with a wear element and a single resilient element at a fastener.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
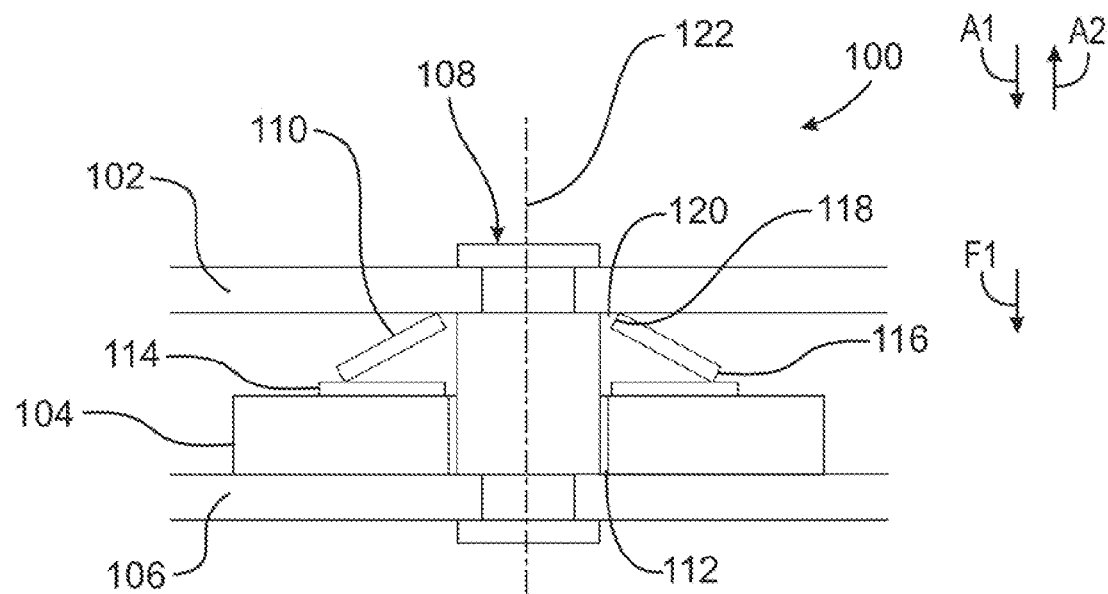

FIG. 2 is a cross-section of a portion of hysteresis assembly 100 with a wear element and a single resilient element at a fastener. Hysteresis assembly 100 includes plates 102, 104, and 106, at least one fastener 108, and at least one resilient element 110. Fastener 108 connects plates 102 and 106. Resilient element 110: is wholly disposed in an axial direction between plates 102 and 104; disposed about fastener 108; and urges plate 104 into frictional contact with plate 106, for example, by urging plate 104 in direction A1. Fastener 108 is fixed with respect to plates 102 and 106 and passes through plate 104, for example, passes through opening 112 in plate 104. Plate 104 is at least partially rotatable with respect to fastener 108, for example, opening 112 is large enough to enable the fastener to circumferentially displace within the opening. In one embodiment, resilient element 110 is in contact with plates 102 and 104. In one embodiment, assembly 100 includes wear element 114 disposed between resilient element 110 and plate 104 and in contact with resilient element 110 and plate 104. As further described below, wear element 114 protects plate 104 from damage due to the displacement of resilient element 110. In an example embodiment, resilient element 110 is a diaphragm spring or belleville washer. In an example embodiment, fastener 108 is a rivet.

Figure 3:
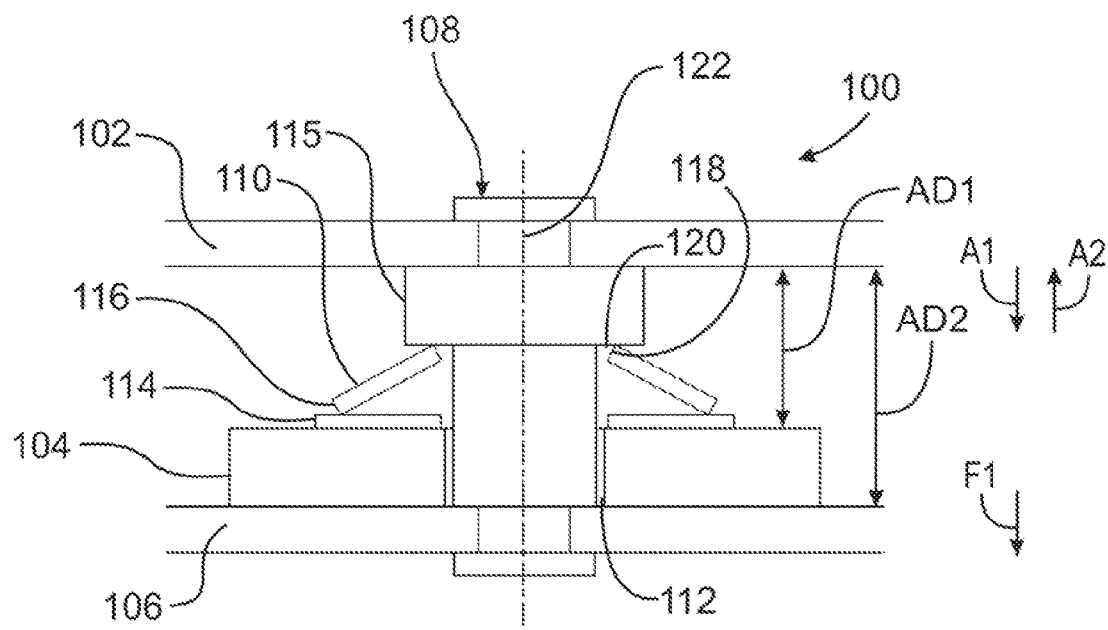
FIG. 3 is a cross-section of a portion of a hysteresis assembly with a wear element, a spacer element, and a single resilient element at a fastener.

FIG. 3 is a cross-section of a portion of hysteresis assembly 100 with a wear element, a spacer element, and a single resilient element at a fastener. In one embodiment, assembly 100 includes at least one spacer element 115 between plate 102 and resilient element 110 and in contact with plate 102 and resilient element 110. In one embodiment, the spacer element is formed of a same piece of material as the fastener, that is, the spacer element is integral to the fastener. In one embodiment, the spacer element is separate from the fastener, for example, the spacer element is a washer disposed about the fastener. Spacer element 115 can be used to control or modify axial distance AD1 between plates 102 and 104 or to control or modify axial distance AD2 between plates 102 and 106, for example, to increase respective values for AD1 and AD2.

Figure 4:
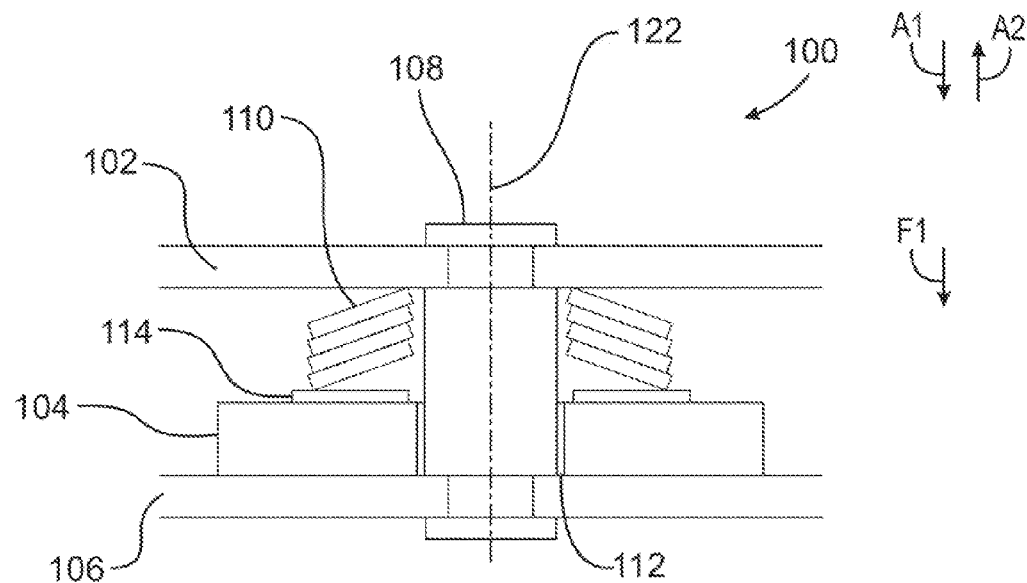
FIG. 4 is a cross-section of a portion of a hysteresis assembly with a wear element and a plurality of resilient elements, in a parallel orientation, at a fastener.

FIG. 4 is a cross-section of a portion of hysteresis assembly 100 with a wear element and a plurality of resilient elements, in a parallel orientation, at a fastener.

Figure 5:
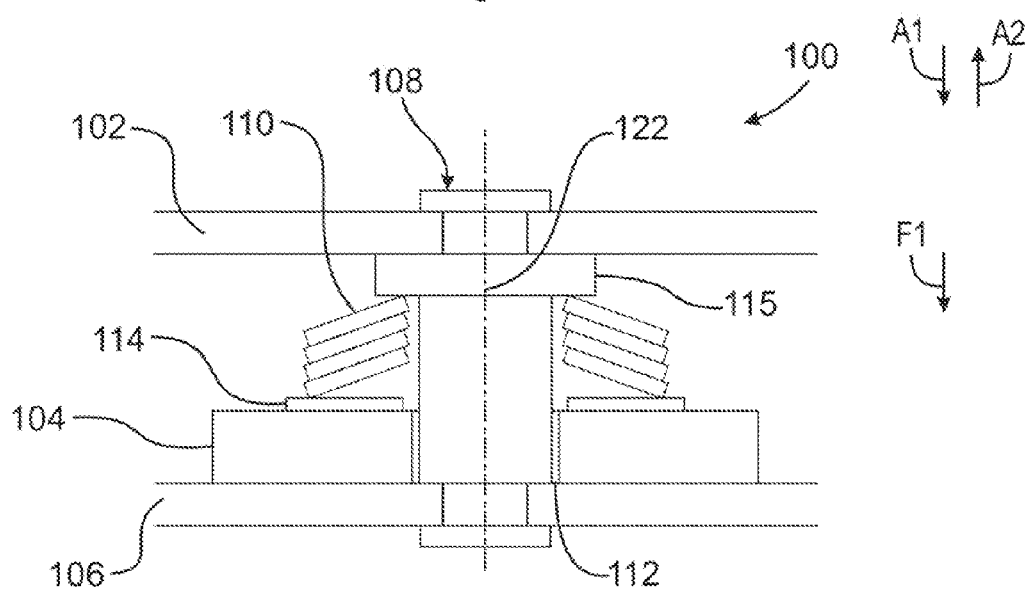
FIG. 5 is a cross-section of a portion of a hysteresis assembly with a wear element, a spacer element, and a plurality of resilient elements, in a parallel orientation, at a fastener.

FIG. 5 is a cross-section of a portion of a hysteresis assembly with a wear element, a spacer element, and a plurality of resilient elements, in a parallel orientation, at a fastener.

Figure 6:
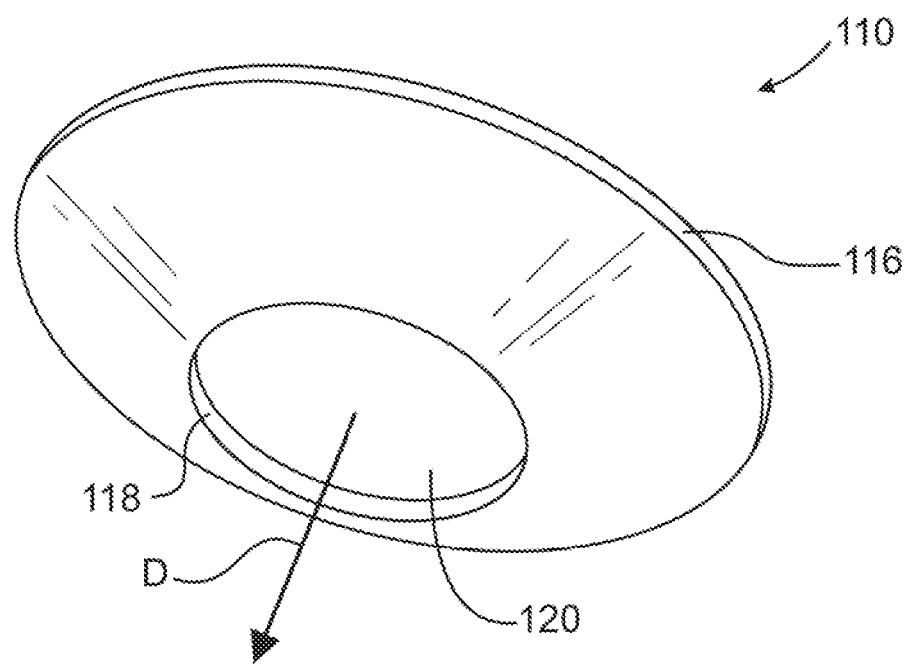
FIG. 6 is a perspective view of a resilient element.

FIG. 6 is a perspective view of a resilient element. The following should be viewed in light of FIGS. 2 through 6. In one embodiment assembly 100 includes a plurality of resilient elements 110 having respective outer circumferences 116 and respective openings 118 forming respective inner circumferences 120. As shown in FIG. 6, an inner circumference 120 is disposed further in direction D, with respect to axis 122 passing through opening 118, than an outer circumference 116. In one embodiment, as shown in FIGS. 4 and 5, for each resilient element 110 in the plurality of resilient elements, direction D is in the same direction, for example, parallel to direction A1 or A2. In FIGS. 4 and 5, the same direction is A2, that is, from plate 104 toward plate 102. That is, each resilient element is in a same configuration in which the inner circumference is closer to one of plates 102 or 104 than the outer circumference. This is a parallel configuration in which the resistance of resilient elements 110 to compression is additive, as further described below.

Stated otherwise, as shown in FIGS. 4 and 5, each resilient element 110 in the plurality of resilient elements 110 exerts a respective force resisting compression of the respective inner and outer circumference toward each other. This force can be expressed in terms of the spring constant for the resilient element, which has the general form k=y force/distance of compression, for example, k=y Newtons/meter. In the parallel configuration of FIGS. 4 and 5, assuming k is the same for each element and plate 102 is compressed a distance d toward plate 104 (assuming plate 102 starts in contact with elements 110, but is not applying an axial force to the elements) the net force F1 exerted by the three elements 110 on plate 104 can be expressed as F1=(k×d)+(k×d)+(k×d). Thus, if y=100 and d=0.001 m (one millimeter), the net force F1 exerted by the three elements 110 on plate 104 is F1=(100 Newtons/meter× 0.001 meters)+(100 Newtons/meter×0.001 meters)+(100 Newtons/meter×0.001 meters)=0.3 Newtons. Elements 110 react against plate 102 to generate Force F1 in direction A1, urging plate 104 into frictional contact with plate 106.

Figure 7:
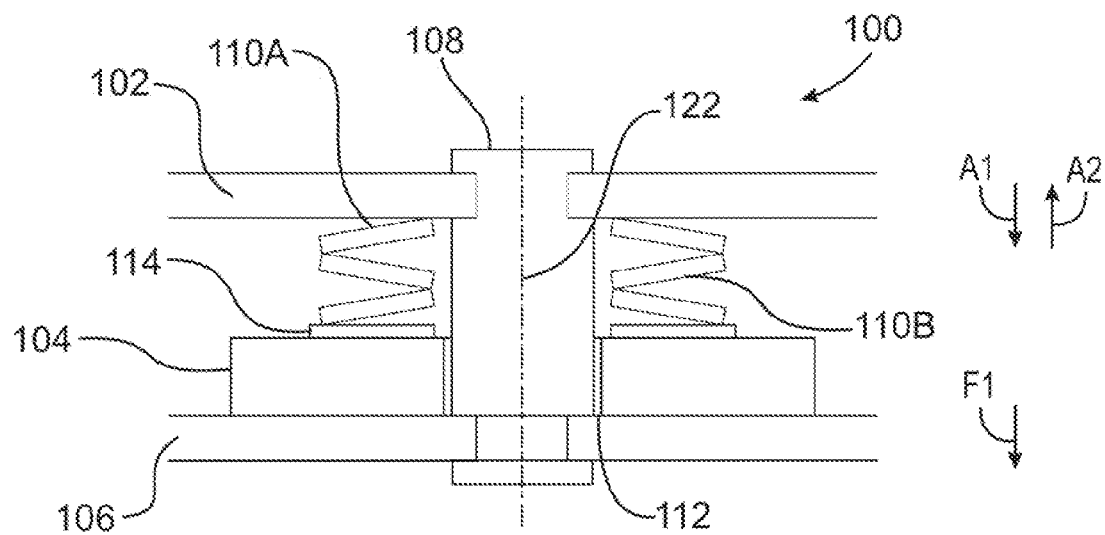
FIG. 7 is a cross-section of a portion of a hysteresis assembly with a wear element and a plurality of resilient elements, in a series orientation, at a fastener.

FIG. 7 is a cross-section of a portion of hysteresis assembly 100 with a wear element and a plurality of resilient elements, in a series orientation, at a fastener.

Figure 8:
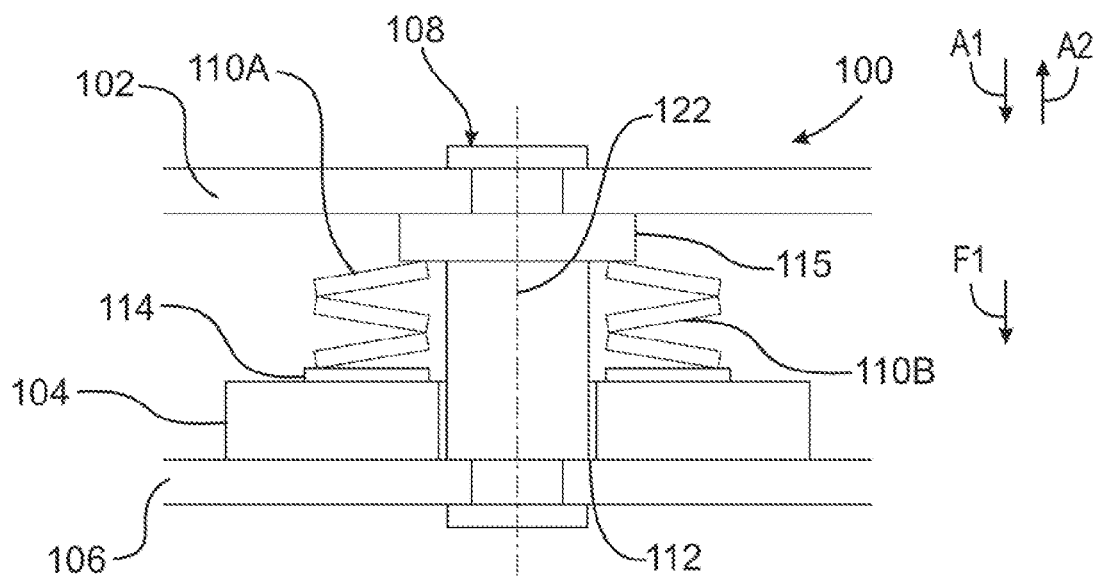
FIG. 8 is a cross-section of a portion of a hysteresis assembly with a wear element, a spacer element, and a plurality of resilient elements, in a series orientation, at a fastener; and, FIG. 9 is a partial cross-sectional view of a damper assembly incorporating a hysteresis assembly.

FIG. 8 is a cross-section of a portion of hysteresis assembly 100 with a wear element, a spacer element, and a plurality of resilient elements, in a series orientation, at a fastener. The following should be viewed in light of FIGS. 2, 3, and 6 through 8. For at least one resilient element 110 in the plurality of resilient elements, for example, element 110A, direction D is in one direction and for at least one other resilient element 110, for example, 110B, direction D is in another, opposite direction. For example, for 110A, D is parallel to direction A2, from plate 104 toward plate 102 and for 110B, D is parallel to direction A1 from plate 102 toward plate 104.

It should be understood that the directions noted above could be reversed. This is a series configuration in which the resistance of resilient elements 110A and 110B to compression in direction A1 is not additive as described below. In FIG. 5, resilient elements 110A and 110B alternate.

As described above, force generated by compression of an element 110 can be expressed in terms of the spring constant for the resilient element, which has the general form k=y force/distance of compression, for example, k=y Newtons/meter. In the series configuration of FIGS. 4 and 5, assuming k is the same for each element and plate 102 is compressed a distance d toward plate 104 (assuming plate 102 starts in contact with elements 110, but is not applying an axial force to the elements) the net force F1 exerted by the three elements 110 on plate 104 can be expressed as 1/F1=1/(k×d)+1/(k×d)+1/(k×d). Thus, if y=100 and d=0.001 m (one millimeter), the net force F1 exerted by the three elements 110 on plate 104 is 1/F1=1/(100 Newtons/meter×0.001 meters)+1/(100 Newtons/meter×0.001 meters)+1/(100 Newtons/meter×0.001 meters)=30 Newton$^{-1}$, so F1=0.033 Newtons. Elements 110 react against plate 102 to generate Force F1 in direction A1, urging plate 104 into frictional contact with plate 106.

It should be understood that a combination of series and parallel configurations is possible. For example, for three elements 110, two adjacent elements 110 could be in a parallel configuration and the remaining element 110 could be in a series configuration. The respective calculations for parallel and series forces would be applied as applicable. For example, if two adjacent elements 110 are stacked together in a parallel configuration, for example, as shown for the top two elements 110 in FIGS. 4 and 5 and a third element 110 is configured as shown for element 110B in FIGS. 7 and 8, F1 would be calculated as follows (assuming the same values for y and k as noted above): 1/F1=(1/[(k×d)+(k×d)])+1/(k×d)= (1/[0.1 Newton+0.1 Newton])+(1/0.1 Newton)=15 Newton$^{-1}$, so F1=0.067 Newton. Thus, for a same number of elements 110, F1 for the combined configuration falls somewhere between F1 for the series and parallel configurations.

Figure 9:
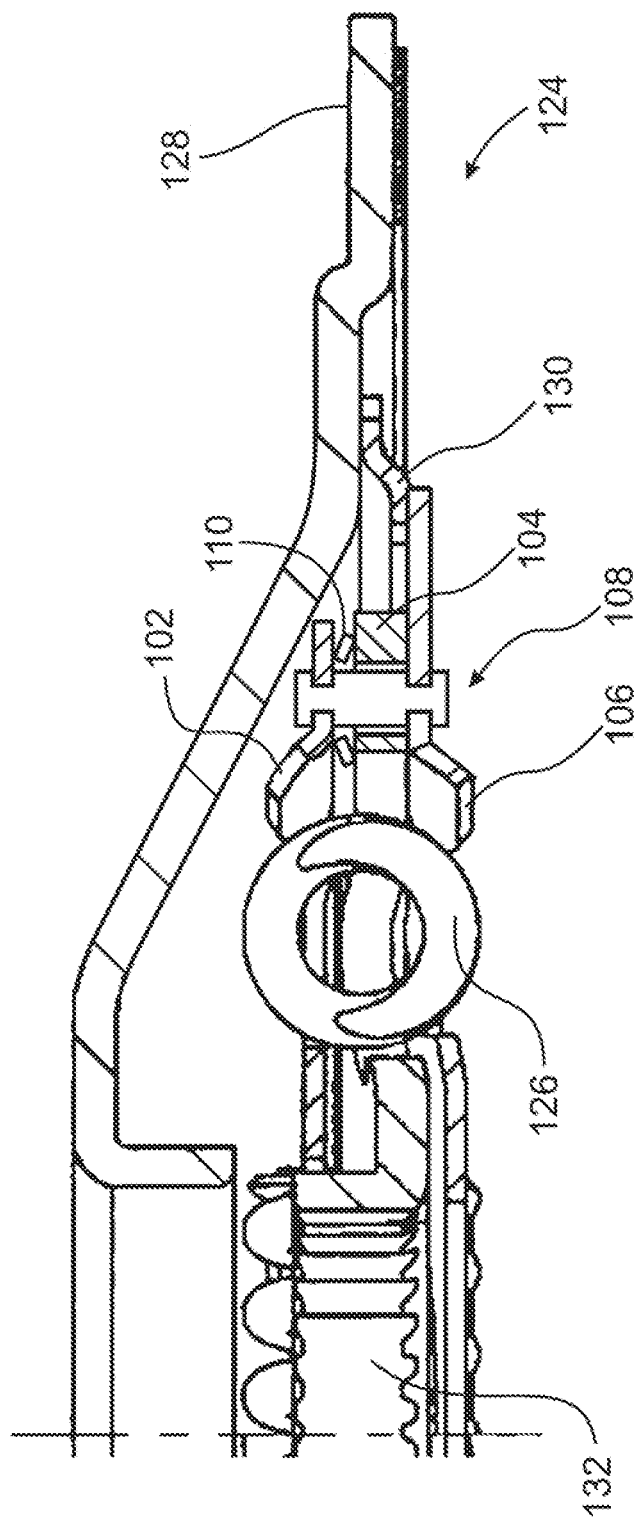

FIG. 9 is a partial cross-sectional view of a damper assembly incorporating hysteresis assembly 100. The configuration of assembly 100 is similar to that shown in FIG. 2, that is, there is no spacer element 115 used. In one embodiment, assembly 100 includes damper assembly 124. Plates 102 and 106 are cover plates for the damper assembly and plate 104 is a flange for the damper assembly. The damper assembly also includes at least one spring 126, for example, a coil spring. Plates 102 and 106 are arranged to receive torque, for example, from cover 128 and drive plate 130. The cover plates transmit the torque to spring 126, which in turn transmits the torque to the flange. The flange transmits the torque to output hub 132. It should be understood that any configuration of assembly 110, including, but not limited to, the respective configurations shown in FIGS. 3-5, 7, and 8 can be used with a damper assembly.

Advantageously, unlike the prior art arrangements noted above, assemblies 100 and 124 do not require a full 360 degree access in order to install the means for creating hysteresis is the assemblies, that is to install elements 110. Specifically, access is only required in the limited area around fasteners 108. Further, much less scrap material is generated by the stamping of the relatively small elements 110, in comparison with the stamping of a large diaphragm spring as described above. In addition, assemblies 100 and 124 are modular, advantageously increasing production flexibility. For example, a typical assembly 100 or 124 includes a plurality of fasteners 108. Elements 110 can be installed at some or all of the fastener locations as desired. Further, different numbers and configurations of elements 110 can be installed at the fastener locations. For example, as noted above, elements 110 can be configured in series or parallel configurations or in combinations of series and parallel configurations. Stacking elements 110 in series can stretch out a load curve for the stacked elements to accommodate a higher range of spacing tolerances between plates 104 and 106. Stacking elements 110 in parallel can create a much higher spring load to accommodate high-hysteresis applications.

Although hysteresis assembly 100 and damper assembly 124 have been shown with respective configurations of components, it should be understood that assemblies 100 and 124 are not limited to the respective configurations of components shown and that other respective configurations of components are possible.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A damper assembly, comprising:
    first and second cover plates arranged to receive torque;
    a flange axially disposed between the first and second cover plates;
    at least one first resilient element engaged with the first and second cover plates and the flange and arranged to transmit the torque to the flange;
    at least one fastener, each fastener in the at least one fastener:
        including a respective axis; and,
        connecting the first and second cover plates so that the first and second cover plates are fixed with respect to each other in first and second opposite axial directions parallel to the respective axis; and,
        passing through the flange; and,
    at least one second resilient element, each second resilient element included in the at least one second resilient element:
        axially disposed between the first cover plate and the flange;
        concentrically disposed about a single respective fastener included in the at least one fastener; and,
        arranged to urge the flange into frictional contact with the second cover plate.

2. The damper assembly of claim 1, wherein:
    the at least one fastener is fixed with respect to the first and second cover plates; and,
    the flange is at least partially rotatable with respect to the at least one fastener.

3. The damper assembly of claim 1, further comprising a wear element, separate from the at least one resilient element and the flange, disposed between the at least one resilient element and the flange, and in contact with the at least one resilient element and the flange.

4. The hysteresis assembly of claim 1, further comprising at least one spacer element between the first cover plate and the at least one second resilient element and in contact with the at least one second resilient element.

5. The hysteresis assembly of claim 4 wherein:
    the at least one spacer element is formed of a same piece of material as the at least one fastener; or, the at least one spacer element is separate from the at least one fastener.

6. The hysteresis assembly of claim 1,
wherein:
the at least one resilient element includes a plurality of resilient elements having respective outer circumferences and respective openings forming respective inner circumferences; and,
the respective inner circumferences are disposed further in a first direction than the respective outer circumferences; and,
wherein:
for each resilient element in the plurality of resilient elements, the first direction is the first axial direction; or,
for each resilient element in the plurality of resilient elements, the first direction is the second axial direction.

7. The hysteresis assembly of claim 1, wherein:
the at least one second resilient element includes a plurality of second resilient elements:
located in series with respect to the first and second axial directions; and,
having respective outer circumferences and respective openings forming respective inner circumferences;
each second resilient element in the plurality of second resilient elements exerts a respective force proportional to an amount by which the respective inner and outer circumferences are compressed toward each other; and,
the plurality of second resilient elements is arranged to urge the second plate into frictional contact with the third plate with a force less than the respective force for a single second resilient element in the plurality of second resilient elements.

8. The damper assembly of claim 1, wherein:
the at least one fastener includes a plurality of fasteners;
the at least one second resilient element includes a plurality of second resilient elements; and,
each second resilient element in the plurality of second resilient elements is concentrically disposed about only one single respective fastener included in the plurality of fasteners.

9. A damper assembly, comprising:
first and second cover plates arranged to receive torque;
a flange axially disposed between the first and second cover plates;
at least one first resilient element engaged with the first and second cover plates and the flange and arranged to transmit the torque to the flange;
a plurality of fasteners, each fastener included in the plurality of fasteners:
including a respective axis;
fixedly connected to the first and second cover plates;
fixing the first and second plates with respect to each other in first and second opposite axial directions parallel to the respective axis;
passing through the flange, and at least partially rotatable with respect to the flange; and,
a plurality of second resilient elements, each second resilient element:
wholly axially disposed between the first cover plate and the flange;
disposed about a single respective fastener included in the plurality of fasteners;
arranged to urge the flange into frictional contact with the second cover plate; and,
having a respective outer circumference and a respective opening forming a respective inner circumference, the respective inner circumference disposed further in a first direction than the respective outer circumference:
wherein for said each second resilient element in the plurality of second resilient elements:
the first direction is the first axial direction; or,
the first direction is the second axial direction; or,
wherein:
for one second resilient element in the plurality of second resilient elements, the first direction is the first axial direction; and,
for another second resilient element in the plurality of second resilient elements, the first direction is the second axial direction.

* * * * *